April 17, 1928. 1,666,881
C. LAMPRE
EQUALIZING MECHANISM FOR FOUR-WHEEL BRAKES
Filed Aug. 26, 1925 2 Sheets-Sheet 2
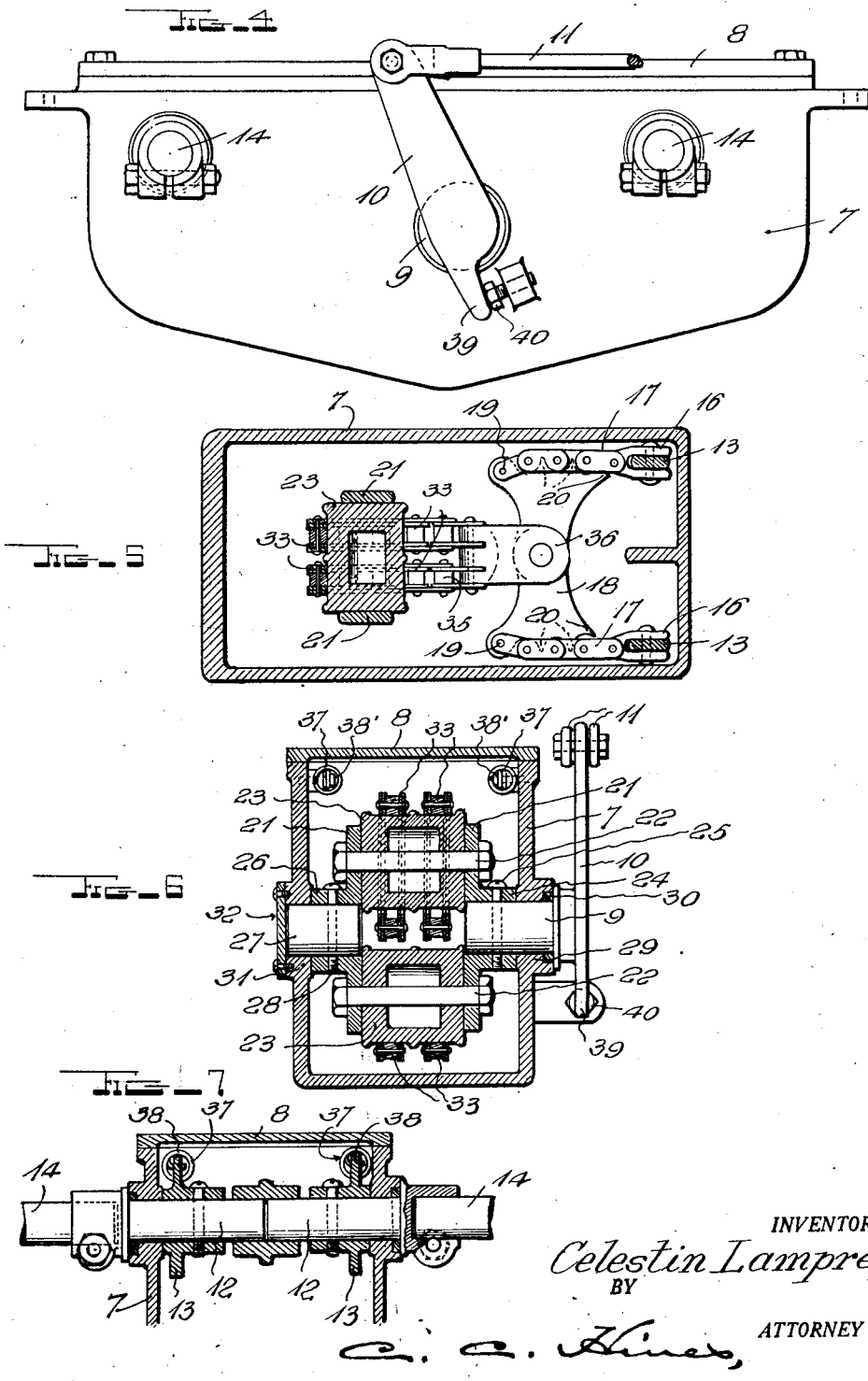
INVENTOR:
Celestin Lampre,
BY
ATTORNEY.

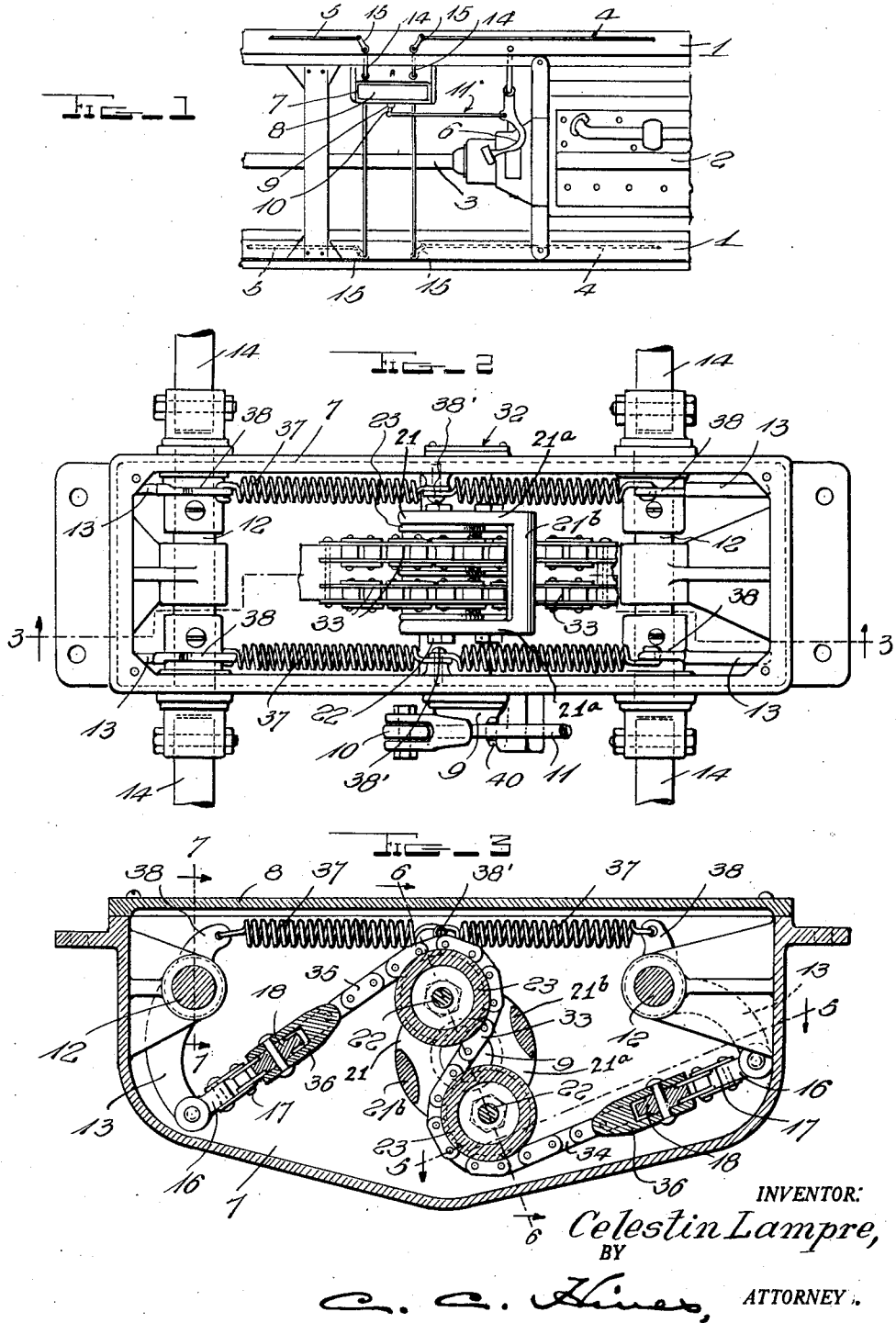

Patented Apr. 17, 1928.

1,666,881

UNITED STATES PATENT OFFICE.

CELESTIN LAMPRE, OF CLEVELAND, OHIO.

EQUALIZING MECHANISM FOR FOUR-WHEEL BRAKES.

Application filed August 26, 1925. Serial No. 52,672.

This invention relates to four-wheel automobile brakes, and particularly to equalizing mechanism for brakes of this character.

One object of the invention is to provide an equalizing mechanism which will independently equalize the front wheel brakes and the rear wheel brakes, and which will also equalize both sets of brakes.

A further object of the invention is to provide a self-contained equalizing mechanism which may be applied to any automobile, and which is enclosed in a dust-proof casing which may form a reservoir for a suitable lubricant in which the parts may work, whereby the equalizing mechanism will be protected against the entrance of foreign substances and possible damage or injury, and kept lubricated and at all times for a free and easy working action.

A still further object of the invention is to provide an equalizing mechanism which is simple of construction, reliable and efficient in operation, not liable to get out of order, and capable of being manufactured, installed and maintained in working order at a comparatively low cost.

The invention consists of the features of construction, combination and arrangement of parts, hereinafter fully described and claimed, reference being had to the accompanying drawings, in which:—

Figure 1 is a fragmentary top plan view in perspective showing the applicaton of the invention to an automobile chassis.

Figure 2 is a top plan view of the motion transmitting and equalizing mechanism per se, with the cover of its casing removed.

Figure 3 is a vertical longitudinal section on line 3—3 of Figure 2, with the casing cover applied.

Figure 4 is a side elevation of the equalizing mechanism shown in Figures 2 and 3.

Figure 5 is a sectional plan view on line 5—5 of Figure 3.

Figure 6 is a vertical transverse section on line 6—6 of Figure 3.

Figure 7 is a vertical transverse section on line 7—7 of Figure 3.

Referring now more particularly to the drawings, 1 designates the chassis frame of an automobile, 2 the automobile motor, 3 the propeller shaft driven from the motor through the usual transmission mechanism, 4 the brake actuating rods leading to the front brakes, 5 the brake actuating rods leading to the rear brakes, and 6 a primary brake actuating lever, which may be the brake pedal lever commonly employed. I have not deemed it necessary to show the brake devices actuated by the rods 4 and 5, as those in common use or any others suited for the purpose may be employed.

In carrying my invention into practice, I provide a brake actuating and equalizing mechanism which is operatively coupled to the pedal or actuating device 6 for transmitting brake applying motions to the rods 4 and 5. This motion transmitting and equalizing mechanism is enclosed within a suitable dust-proof casing 7, having a detachable top cover or closure 8, and suitably constructed for attachment to the chassis frame 1, the casing being shown in the present instance as bolted or riveted to one of the side bars of the chassis frame. Journaled centrally in this casing 7 is a horizontal transverse rock shaft 9, which extends outwardly at one side of the casing and has fixed thereto a crank arm 10 coupled by a connecting rod 11 to the lever 6. Journaled in the ends of the casing 7 are pairs or sets of horizontal transverse rock shafts 12 to which are fixed motion transmitting levers 13, arranged within the casing. The shafts 12 extend outwardly beyond opposite sides of the casing and are coupled to extension rock shafts 14 provided with crank arms 15, the crank arms 15 of one pair or set of shafts 14 being connected with the brake rods 4, while the crank arms 15 of the other set of extension rock shafts are connected to the brake rods 5, the forward set of levers 13 therefore operating to transmit brake applying and releasing motions to the front wheel brakes, and the rear set of levers 13 operating to transmit brake applying and releasing motions to the rear wheel brakes. In practice, the extension shafts 14, which may be journaled in the chassis frame bars 1, are preferably made independent of the shafts 12 and detachably coupled thereto, the shafts 12 being permanently mounted within the casing 7, so that all parts of the motion transmitting and equalizing mechanism except said extension shafts will be self-contained within or by the casing, the casing and its parts forming a unit of portable type convenient of application to an automobile and of removal therefrom and of being shipped in a unitary or self-contained condition.

Pivotally coupled at one end by a clevis 16 to each lever 13 is a short chain section 17, preferably of sprocket chain type, and the pair of levers 13 at each end of the casing are operatively connected by the chains 17 attached thereto and to an equalizing lever 18, to the opposite arcuately shaped ends of which lever the chains 17 are pivotally coupled, as at 19. Each equalizing lever 18, is disposed transversely of the casing, at a point between its coacting motion transmitting levers 13 and the center of the casing, and the pivotal connections 19 are made between the inner ends of the chains 17 and the inner or rear corners of said levers, between which points and their front corners such arcuately shaped ends of the levers are formed with sprocket teeth 20 to engage the sprocket elements of the chains. By this construction each lever 18 is at all times positively coupled to the chain sections 17, but may swing easily and freely laterally with respect to either chain section for the purpose of permitting said chain sections and the levers 13 to have differential motions for equalizing actions, as hereinafter described. From the foregoing it will be seen that a pair of levers 13 is arranged at each end of the casing 7, carried by independently movable rock shafts 14, which levers are coupled for conjoint motion to equal degrees with an associated equalizing lever 18, through the pivotal motions of which the levers 13 are permitted to have variable or differential equalizing brake transmitting movements, the equalizing lever mechanisms described being in duplicate at each end of the casing, one set being coupled to the front brake applying rods and the other set to the rear brake applying rods.

The rock shaft 9 carries within the casing 7 a secondary actuating lever 21, which is fixed centrally thereto, and which is adapted to receive rocking motions from the primary actuating lever 6 through the crank arm 10 and connecting rod 11. This lever 21 is in the form of a rocking cross-head, comprising oppositely disposed and spaced disk portions or heads 21ª united at their front and rear sides by integral cross bars 21ᵇ and connected at top and bottom by bolts 22 forming pivotal supports for rollers or pulleys 23, disposed on opposite sides of or above and below the axis of the lever. One disk or head 21ª of this lever is formed with a socket 24 to receive the shaft 9 which is comparatively short and of a length to fit therein, and which is detachably secured in said socket by a pin or key 25, and the other disk or head 21ª of the lever is formed with a socket 26 receiving a stub shaft 27 journaled in the opposite side of the casing and detachably secured to said socket by a pin or key 28, a divided shaft construction being thus produced so as to leave a clear guide space between the disks or heads of the lever and between the inner peripheries of the rollers 23. The shaft 9 is preferably journaled in a bearing 29 formed at one side of the casing 7, with which bearing is associated a suitable packing 30 to prevent leakage of lubricant therethrough, while the shaft 27 is journaled in a bearing 31 at the opposite side of the casing, which is preferably of open type and closed by a detachable cover plate 32, such construction allowing of the ready and convenient application and removal of the bearing elements and assemblage and disassemblage of the parts of the secondary motion transmitting lever, as will be readily understood. A motion transmitting chain 33 passes through the center guide space between the heads 21ª of the lever 21 and between arms 21ᵇ and pulleys 23 and is thence formed into reversely projecting loops or bights passing around the pulleys 23 in opposite directions, the opposite ends 34 and 35 of said chain being provided with clevises 36 which are coupled to and pivotally support the respective levers 18 centrally of their ends, the said ends 34 and 35 of the chain 33 respectively forming draft connections between the lever 21 and the levers 18 coupled respectively to the front brake actuating rods 4 and the rear brake actuating rods 5, whereby said brake actuating rods may be simultaneously operated. Coiled retracting springs 37 extend longitudinally of the casing 7 at each side thereof, which springs are fastened at their outer ends to crank lugs 38 on the levers 13, the springs at each side being secured at their inner ends by a screw 38' or the like to the adjacent side of the casing. The function of these springs is by their contractile energy to return the elements of the brake mechanism to normal position after each operative action thereof by the brake lever 6 and upon the release of pressure from the latter. If desired, the crank arm 10 may be provided with a stop lug or extension 39 to abut against an adjustable stop member or screw 40 on the casing to limit the return movement of the lever 21, proper adjustment being afforded for setting said lever at a proper starting position for an accurate working action of the parts operated thereby.

In the operation of the brake applying and equalizing mechanism, assuming that both the front and rear brakes are in release position, it will be understood that when the lever 6 is moved forwardly to transmit brake applying action to the lever 21, the latter will be rocked on its axis, through the intermediate connections 10 and 11, to move its upper end forwardly and its lower end rearwardly, thereby drawing in opposite directions upon both chain ends 34 and 35 to transmit brake applying motions to the levers 18, which will operate through the chains 17, levers 13, rock shafts 12 and extension rock shafts 14 to transmit brake applying motions to the brake actuating rods 4 and 5. If both sets of brake shoes or bands have the same range of motion and apply with equal force within the same operating period, the brake applying motion of the mechanism will be uniformly transmitted thereto through equal movements of all the working parts, as a result of which the end portions 34 and 35 of the chain 33, which are normally of equal length, will remain so during the working movement of the lever 21, while the levers 18 will remain in a straight transverse position across the casing and will transmit equal brake applying motions through the chains 17 to the levers 13. If, however, one of the brakes of a pair, say one of the front brakes actuated by a rod 4, is applied with full force before its companion front brake, a brake apply motion of the lever 13 and chain 14 connected with the fully applied brake will cease, but the associated lever 18 may swing on its pivotal connection with the chain end 34 to allow the chain 17 and lever 13 coupled to the actuating rod 4 of the unapplied brake to continue their brake applying motion until the latter-named brake is fully set, whereby an equalizing brake applying action of the front brakes will be established. The same action will occur with respect to the brake elements provided for operating the rear wheel brakes under the same conditions, so that an equalizing action of the rear wheel brake applying devices will be established. The rollers 23 and the bight portions of the chain 33 form members of a friction clutch connection between the ends of said chain and the lever 21, or between the levers 18 and the lever 21, whereby an equalizing connection of automatic character will be established between the front and rear sets of brake devices in the event that a compensating brake adjustment action between said sets of brake devices is necessary at any time in the actuation of the brake mechanism in order to secure a proper regulated and positive braking action of the brakes on all four wheels. Normally the frictional engagement between the rollers 23 and chain 33 is sufficient to maintain a fixed engagement between said parts for a brake applying action when the front and rear sets of brakes are fully set simultaneously upon a prescribed working movement of lever 21. If, however, one set of brakes is fully applied or set prematurely or before the other and before the lever 21 has made a full working movement, then and in such event the movement of the chain end connected with the set of brakes which are fully applied will cease, but the lever in its movement will continue to draw on the chain end connected with the other set of brakes not yet fully applied, the resistance of the chain end connected with the fully set brakes causing a slippage of the chain about the rollers 23, the chain running over the rollers to the extent necessary to compensate for the relative variation in the motions required to apply both sets of brakes, whereby an equalizing action between the two sets of brakes is established. When the brakes are released and the parts returned by the springs 37 to normal position, the intermediate portion of the chain slips back over the rollers 23 to normal working position, thus re-establishing normal operating conditions, as will be readily understood. It will thus be seen that my invention provides an equalizing mechanism by means of which an independent equalizing action will be established on either the front or rear wheel brakes, or both, as conditions require, and also by means of which a relative equalizing action between both sets of brakes will be established when conditions require, and that the mechanism provided for this purpose is simple of construction, of a character adapted to be easily operated and not liable to get out of order, and which is entirely automatic in its compensating and equalizing actions.

An equalizing mechanism constructed in accordance with my invention may be easily and conveniently applied to any type of automobile using four-wheel brakes without change in the construction of the brake mechanism of the machine and without change in operating connections except the simple changes required for coupling the brake lever to the equalizing mechanism and the latter to the brake rods. The casing 7 may be of dust-proof character and designed to hold the lubricant in which the parts of the equalizing mechanism may work, by means of which the equalizing mechanism will be protected from the entrance of dust, dirt and other foreign particles and from injury by contact with extraneous objects, ensuring easy motion and long life to these parts of the brake mechanism.

While I have described a preferred type of means for carrying my invention into practical effect, it will, of course, be understood that I do not desire to limit myself in any respect thereto, as equivalent devices and structural means for performing the functions described may be employed within the scope of the appended claims, without departing from the spirit or sacrificing any of the advantages of the invention.

Having thus fully described my invention, I claim:

1. In a four-wheel brake mechanism, front and rear pairs of separate and independent brake actuating levers, an equalizing lever for each pair of brake actuating levers, each equalizing lever having arcuately curved toothed end surfaces, sprocket chains connecting the ends of each equalizing lever with the coacting pair of brake actuating levers and engaging said toothed end surfaces of said equalizing lever, a primary operating element, a rock shaft actuated thereby, a rocker lever actuated by said shaft and provided with arms on opposite sides of its axis, friction rollers carried by said arms, a chain passing in opposite directions around said rollers and connected at its ends with the respective operating levers, said chain being shiftable on the rollers, and springs connected with the brake actuating levers and normally operative thereon to maintain the brakes in release position.

2. In a four-wheel brake mechanism, a casing, pairs of independent rock shafts at opposite ends of the casing, and journaled in the side walls thereof, a brake actuating lever carried by each rock shaft, a power applying rock shaft journaled in the casing between the brake actuating rock shaft, a lever mounted in the casing and operated by said power applying rock shaft, said lever having arms on opposite sides of its axis, friction rollers carried by said arms, equalizing levers in the casing on opposite sides of said power applying lever and between the same and the pairs of brake actuating levers, flexible connections between each pair of brake actuating levers and the ends of the coacting equalizing lever, a chain passing in opposite directions around the rollers on the power applying lever and connected at its ends to the intermediate portions of the oppositely located equalizing levers, and retracting springs connecting the brake actuating levers with the casing.

3. In a brake mechanism, a pair of brake actuating rods, rock shafts coupled thereto, motion transmitting levers connected with said shafts, an equalizing lever having toothed arcuate end edges, sprocket chains engageable with said toothed arcuate end edges of the equalizing lever and permanently connected therewith and with the respective motion transmitting levers, and means centrally connected with the equalizing lever for transmitting brake applying motion thereto.

4. In a four-wheel brake mechanism, front and rear brake actuating rods, an equalizing lever operatively coupled to each pair of rods, a primary actuating element, a pair of spaced alined stub rock shafts, a pair of spaced members carried by said shafts, rollers carried by and between said members eccentric to the rock shafts, and a motion transmitting chain extending in opposite directions around said rollers and coupled at its opposite ends to the respective equalizing levers, said chain being adapted for running motion on the rollers for an equalizing action.

In testimony whereof I affix my signature.

CELESTIN LAMPRE.